United States Patent
Hsu et al.

(10) Patent No.: US 8,823,785 B2
(45) Date of Patent: Sep. 2, 2014

(54) DISPLAY SYSTEM

(75) Inventors: Wei-Ching Hsu, Hsinchu (TW);
Cheng-Han Tsao, New Taipei (TW);
Ken-Yu Liu, Miaoli County (TW);
Chia-Chih Kao, Taoyuan County (TW);
Chao-Yuan Chen, Hsinchu County (TW)

(73) Assignee: Au Optronics Corporation, Hsinchu (TW)

( * ) Notice: Subject to any disclaimer, the term of this patent is extended or adjusted under 35 U.S.C. 154(b) by 607 days.

(21) Appl. No.: 13/037,375

(22) Filed: Mar. 1, 2011

(65) Prior Publication Data
US 2012/0169714 A1 Jul. 5, 2012

(30) Foreign Application Priority Data
Dec. 31, 2010 (TW) ................................ 99147317 A

(51) Int. Cl.
*H04N 13/04* (2006.01)
*G02B 27/26* (2006.01)

(52) U.S. Cl.
CPC ........ *G02B 27/26* (2013.01); *H04N 2013/0463* (2013.01); *H04N 13/0438* (2013.01); *H04N 2213/008* (2013.01); *H04N 13/0452* (2013.01); *H04N 13/0434* (2013.01)
USPC ....................................................... 348/57

(58) Field of Classification Search
USPC ............................................. 345/419; 348/57
See application file for complete search history.

(56) References Cited

U.S. PATENT DOCUMENTS

| | | | |
|---|---|---|---|
| 5,825,541 A * | 10/1998 | Imai | 359/464 |
| 8,284,333 B2 | 10/2012 | Lin et al. | |
| 2006/0061652 A1* | 3/2006 | Sato et al. | 348/53 |
| 2007/0085903 A1 | 4/2007 | Zhang | |
| 2008/0297897 A1* | 12/2008 | Oyamada et al. | 359/465 |
| 2010/0201897 A1* | 8/2010 | Saitoh et al. | 349/13 |

(Continued)

FOREIGN PATENT DOCUMENTS

| | | |
|---|---|---|
| CN | 101025475 | 8/2007 |
| CN | 101359099 | 2/2009 |

(Continued)

OTHER PUBLICATIONS

"First Office Action of China counterpart application" issued on Nov. 21, 2012, p. 1-p. 5.

(Continued)

*Primary Examiner* — Sath V Perungavoor
*Assistant Examiner* — Peter D Le
(74) *Attorney, Agent, or Firm* — Jianq Chyun IP Office

(57) ABSTRACT

A display system including a display apparatus for displaying a first image and a second image, two first lenses and two second lenses is provided. When a viewer sees the display apparatus via one first lenses and one second lenses, and the first image as well as the second image are parallax images, the first and second images are respectively saw by different eyes of the viewer. When the viewer sees the display apparatus through the two first lenses, and the first image as well as the second image are not parallax images, the first image irrelevant to the second image is saw by the viewer. When the viewer sees the display apparatus through the two second lenses, and the first image as well as the second image are not parallax images, the second image irrelevant to the first image is saw by the viewer.

7 Claims, 3 Drawing Sheets

(56) References Cited

U.S. PATENT DOCUMENTS

| | | |
|---|---|---|
| 2010/0238097 A1 | 9/2010 | Baik et al. |
| 2011/0050869 A1* | 3/2011 | Gotoh et al. ............ 348/56 |
| 2011/0199460 A1* | 8/2011 | Gallagher .............. 348/46 |
| 2011/0292308 A1 | 12/2011 | Lin et al. |

FOREIGN PATENT DOCUMENTS

| | | |
|---|---|---|
| CN | 101840073 | 9/2010 |
| JP | 2000-171760 | 6/2000 |
| TW | 200721803 | 6/2007 |
| TW | M395171 | 12/2010 |
| WO | 2010047241 | 4/2010 |

OTHER PUBLICATIONS

"Office Action of Taiwan Counterpart Application", issued on Sep. 16, 2013, p. 1-p. 7.

"Second Office Action of China Counterpart Application", issued on Jul. 30, 2013, p. 1-p. 8.

"Office Action of Taiwan Counterpart Application", issued on Mar. 11, 2014, pp. 1-6.

* cited by examiner

DISPLAY SYSTEM

CROSS-REFERENCE TO RELATED APPLICATION

This application claims the priority benefit of Taiwan application serial no. 99147317, filed Dec. 31, 2010. The entirety of the above-mentioned patent application is hereby incorporated by reference herein and made a part of this specification.

BACKGROUND OF THE INVENTION

1. Field of the Invention

The present invention is related to a display system, and more particularly to, a display system allowing viewers watching different images (two-dimensional images and three-dimensional images) when the viewers wear different lenses combinations.

2. Description of Related Art

In view of the appearance, the technology of three-dimensional display may be roughly categorized into two types. One is stereoscopic type which requires a viewer to wear specially designed glasses and the other is auto-stereoscopic type which allows the viewer to see the three-dimensional images directly with naked eyes. The stereoscopic type three-dimensional display technology has been developed maturely and widely used in military simulation or entertainments. When viewing the three-dimensional display, viewers are required to wear 3D glasses. The 3D glasses allowing left eye and right eye of the viewer receiving parallax images. Usually, the 3D glasses include two lenses with different circular polarization such that the viewers can see 3D images. Besides, the viewer may also see 3D images by persistence of vision. When viewers want to see 2D images from the 3D display, the 3D display is required to be switched to 2D display mode and viewers are only required to take off the 3D glasses. Currently, the 3D glasses can function normally only when operating with the 3D display. If the 3D glasses can have more functions, popularization of 3D display is facilitated.

SUMMARY OF THE INVENTION

The present application provides a display system allowing viewers watching different images when the viewers wear different lenses combinations.

The present application provides a display system including a display apparatus for displaying a first image and a second image, two first lenses and two second lenses. When the display apparatus is saw by different eyes of an viewer via one of the first lenses and one of the second lenses respectively, and the first image as well as the second image are parallax images, the first image and the second image are saw by different eyes of the viewer respectively. When the display apparatus is saw by eyes of the viewer via the two first lenses, and the first image as well as the second image are different images, the first image irrelevant to the second image is saw by eyes of the viewer simultaneously. When the display apparatus is saw by eyes of the viewer via the two second lenses, and the first image as well as the second image are different images, the second image irrelevant to the first image is saw by eyes of the viewer simultaneously.

In an embodiment of the present application, the display apparatus comprises a plurality of first display regions and a plurality of second display regions, the first image is displayed by the first display regions, and the second image is displayed by the second display regions. In an embodiment of the present application, a levorotary circular polarized light is provided by the first display regions, a dextrorotary circular polarized light is provided by the second display regions, each of the first lenses permits the levorotary circular polarized light passing through and cuts the dextrorotary circular polarized light, and each of the second lenses permits the dextrorotary circular polarized light passing through and cuts the levorotary circular polarized light.

In an embodiment of the present application, the display apparatus displays the first image and the second image alternately. During the time the first image is displayed by the display apparatus, each of the first lenses is turned on and each of the second lenses is turned off such that the first image exclusively passes through each of the first lenses. During the time the second image is displayed by the display apparatus, each of the second lenses is turned on and each of the first lenses is turned off such that the second image exclusively passes through each of the second lenses. For example, each of the first lenses comprises a first light-valve, and each of the second lenses comprises a second light-valve.

In an embodiment of the present application, the display apparatus displays the first image and the second image alternately. During the time the first image is displayed by the display apparatus, a levorotary circular polarized light is provided and each of the first lenses permits the levorotary circular polarized light passing through and cuts a dextrorotary circular polarized light. During the time the second image is displayed by the display apparatus, the dextrorotary circular polarized light is provided and each of the second lenses permits the dextrorotary circular polarized light passing through and cuts the levorotary circular polarized light. For example, the display apparatus has a switchable retarder, and the switchable retarder alternately switches between a first retardation state and a second retardation state. When the switchable retarder is switched to the first retardation state, the display apparatus displays the first image. When the switchable retarder is switched to the second retardation state, the display apparatus displays the second image.

In an embodiment of the present application, the switchable retarder comprises a light-valve.

In an embodiment of the present application, when the display apparatus is saw by different eyes of an viewer via one of the first lenses and one of the second lenses respectively, and the first image as well as the second image are parallax images, the first image and the second image respectively saw by different eyes of the viewer constitute a three-dimensional image.

In the present application, the viewers can watch different images when the viewers wear different lenses combinations. Not only a 2D display mode and a 3D display mode are provided by the display system of the present application, but also a multi-view display mode is provided. Accordingly, viewers can respectively see multiple 2D images irrelevant to each other when the display system is switched to the multi-view display mode.

To make the above and other objectives, features, and advantages of the present invention more comprehensible, several embodiments accompanied with figures are detailed as follows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

The First Embodiment

Figure 1:
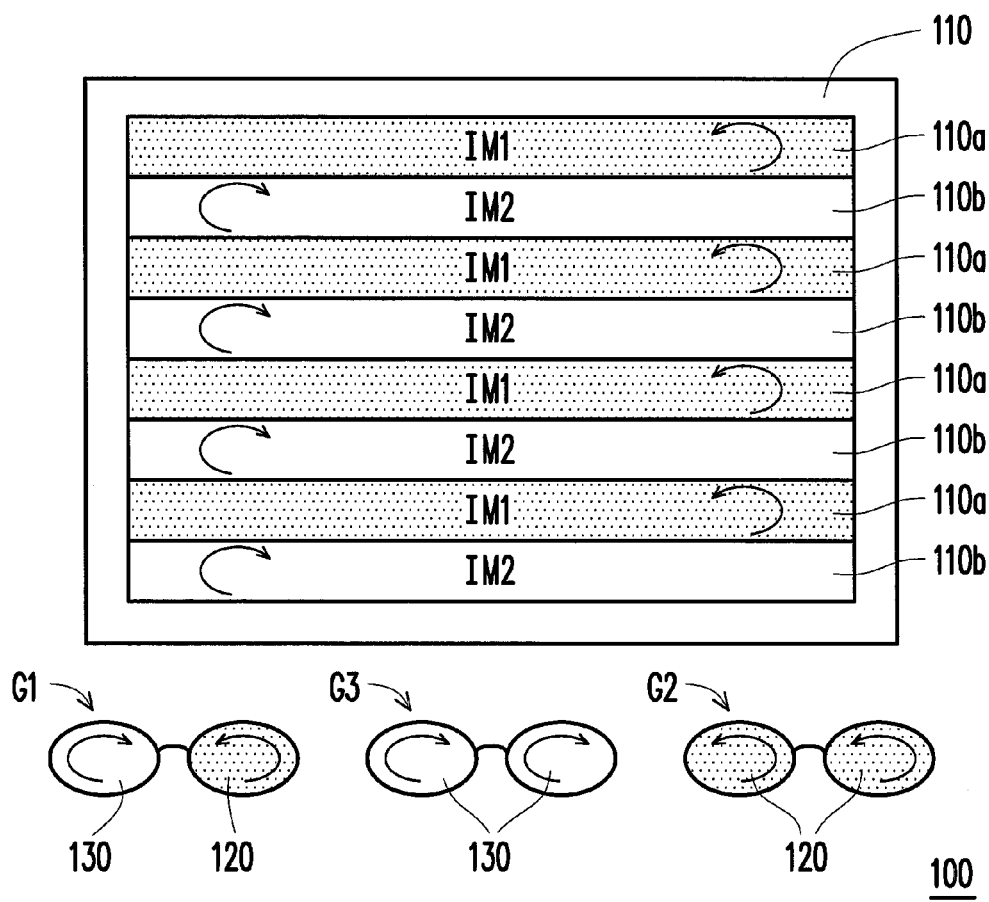
FIG. 1 is a schematic view of a display system according to the first embodiment of the application.

FIG. 1 is a schematic view of a display system according to the first embodiment of the application. Referring to FIG. 1, the display system 100 of the present embodiment includes a display apparatus 110 for displaying a first image IM1 and a second image IM2, two first lenses 120 and two second lenses 130. The display system 100 of the present embodiment may be switched between and operated under the 3D display mode, the 2D display mode and the multi-view display mode. The switching between the 3D display mode, the 2D display mode and the multi-view display mode can be realized by integrated circuit or other suitable switching means. The 3D display mode, the 2D display mode and the multi-view display of the display system 100 are illustrated in detail as followings.

3D Display Mode

When the display system 100 is switched to and operated under the 3D display mode, the first image IM1 and the second image IM2 displayed by the display apparatus 110 are parallax images. The first image IM1 and the second image IM2 are respectively saw by different eyes of the viewer and the viewer can see a 3D image. In order to ensure that the first image IM1 and the second image IM2 can be respectively saw by different eyes of the viewer, the viewer is required to wear a pair of 3D glass G1 including one of the first lenses 120 and one of the second lenses 120 to see the display apparatus 110.

In the present embodiment, the display apparatus 110 comprises a plurality of first display regions 110a and a plurality of second display regions 110b, the first image IM1 is displayed by the first display regions 110a, and the second image IM2 is displayed by the second display regions 110b. For instance, a levorotary circular polarized light is provided by the first display regions 110a, a dextrorotary circular polarized light is provided by the second display regions 110b, each of the first lenses 120 permits the levorotary circular polarized light passing through and cuts the dextrorotary circular polarized light, and each of the second lenses 130 permits the dextrorotary circular polarized light passing through and cuts the levorotary circular polarized light. It is noted that the first display regions 110a and the second display regions 110b are defined by a patterned retarder formed in the display apparatus. For example, phase retardations of the first display regions 110a and the second display regions 110b are 0 and ë/2, respectively. In an alternative embodiment of the present application, phase retardations of the first display regions 110a and the second display regions 110b are +ë/4 and −ë/4, respectively.

As shown in FIG. 1, the first display regions 110a and the second display regions 110b are bar shaped regions. The first display regions 110a and the second display regions 110b are arranged alternately along a predetermined direction and the extending direction of the first display regions 110a and the second display regions 110b is substantially parallel to the long edge of the display apparatus 110. However, the extending direction of the first display regions 110a and the second display regions 110b is limited in the present application. In other words, the extending direction of the first display regions 110a and the second display regions 110b is substantially parallel to the short edge of the display apparatus 110. In an alternative embodiment, an included angle between the extending direction of the first display regions 110a and the short edge of the display apparatus 110 is an acute angle.

Since the light with different circular polarizations can be recognized by the first lenses 120 and the second lenses 130, cross-talk between the first image IM1 and the second image IM2 saw by different eyes of the viewer does not occur.

It is noted that when the display system 100 is switched to and operated under the 3D display mode, the first image IM1 and the second image IM2 displayed by the display apparatus 110 may be complete different images, i.e. the first image IM1 and the second image IM2 are not parallax images. At this time, the viewer who wears the pair of 3D glass G1 can not see 3D image, the viewers who wear a pair of glass G2 and a pair of glass G3 respectively can see different images display from the same display apparatus 110.

2D Display Mode

When the display system 100 is switched to and operated under the 2D display mode, the first image IM1 and the second image IM2 displayed by the display apparatus 110 are not parallax images. The first image IM1 displayed by the first display regions 110a and the second image IM2 displayed by the second display regions 110b constitute a 2D image. Under the 2D display mode, the viewer is not required to wear the pair of 3D glass G1 and the viewer can the 2D image. In addition, the resolution of the 2D image constituted by the first image IM1 and the second image IM2 is the same as the real resolution of the display apparatus 110.

Multi-View Display Mode

When the display system 100 is switched to and operated under the multi-view display mode, the first image IM1 and the second image IM2 displayed by the display apparatus 110 are not required to be parallax images. The first image IM1 and the second image IM2 are irrelevant to each other. For example, the first image IM1 and the second image IM2 are entirely different (e.g. different pictures or different TV programs). In addition, when the display system 100 is switched to and operated under the multi-view display mode, the viewers who wear a pair of glass G2 and a pair of glass G3 respectively can see different images display from the same display apparatus 110. Specifically, when the display apparatus 110 is saw by the viewers who wear the pair of glass G2 including two first lenses 120, both eyes of the viewer see the first image IM1 irrelevant to the second image IM2 simultaneously. In other words, the second image IM2 is not saw by the viewers who wear the pair of glass G2.

Similarly, when the display apparatus 110 is saw by the viewers who wear the pair of glass G3 including two second lenses 130, both eyes of the viewer see the second image IM2 irrelevant to the first image IM1 simultaneously. In other words, the first image IM1 is not saw by the viewers who wear the pair of glass G3.

As mentioned above, the pair of glass G2, the pair of glass G3 and the display apparatus 110 satisfy the requirements of two viewers.

It is noted that, in addition to the first display regions 110a and the second display regions 110b, the display apparatus 110 may further include other display regions (e.g. the third display regions, the fourth display regions, and the $n^{th}$ display regions etc.). In this way, the display apparatus 110 may satisfy the requirements of more viewers. For example, the images displayed by the third display regions, the fourth display regions, the $n^{th}$ display regions are required to be different from the first image IM1 and the second image IM2 such that viewers who wear glasses rather than the pair of glass G2 and the pair of glass G3 can see the images displayed by the third display regions, the fourth display regions, and the $n^{th}$ display regions respectively.

The first lenses 120 and the second lenses 130 of the glasses G1, G2 and G3 are designed to be detachable such that the viewers can detach the first lenses 120 and the second lenses 130 and recombine the lenses. For Example, the quantity of the first lenses 120 may be two or more than two and the quantity of the second lenses 130 may be two or more than two such that the viewers can obtain pairs of glasses G2 and G3 by recombination of the first lenses 120 and the second lenses 130. However, the detachable design of the first lenses 120 and the second lenses 130 is not necessary in the present application.

The Second Embodiment

Figure 2:
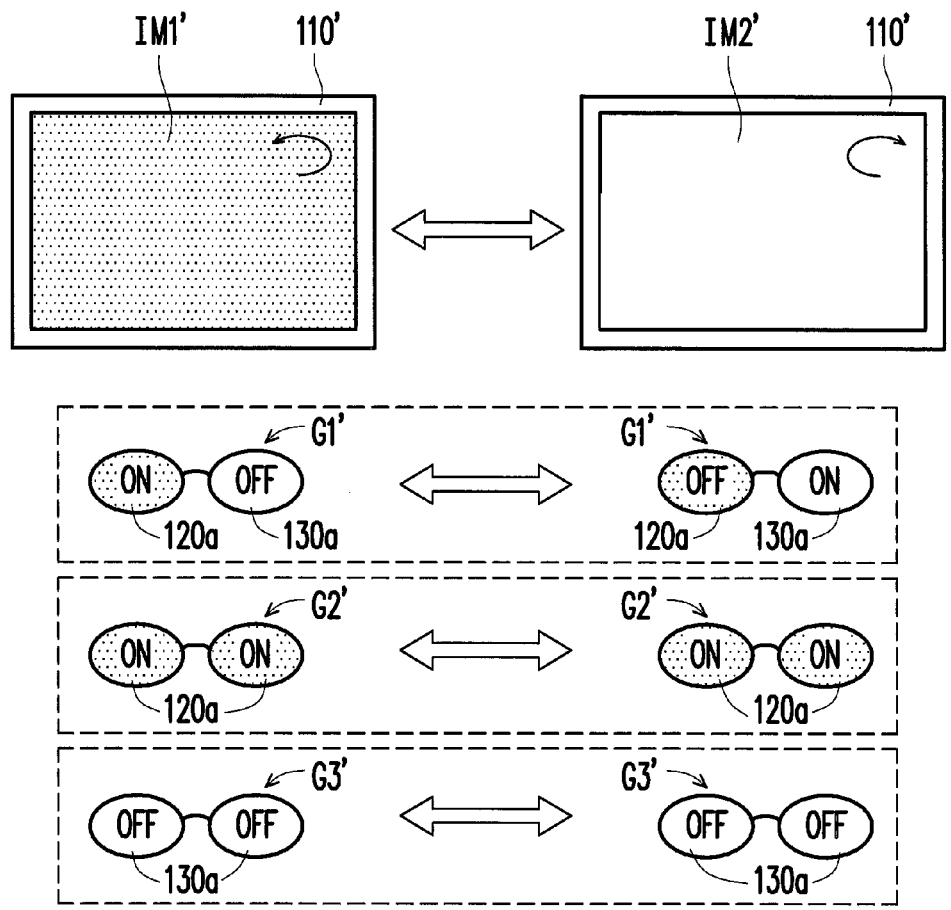
FIG. 2 is a schematic view of a display system according to the second embodiment of the application.

FIG. 2 is a schematic view of a display system according to the second embodiment of the application. Referring to FIG. 2, the display system 100a of the present embodiment includes a display apparatus 110' for displaying a first image IM1' and a second image IM2' alternately, two first lenses 120a and two second lenses 130a. It is noted that, the operation of the first lenses 120a and the second lenses 130a should be synchronized with the operation of the display apparatus 110' such that the switching (on/off) frequency of the first lenses 120a and the second lenses 130a is substantially identical with the refresh frequency of the images (i.e. the first image IM1' and the second image IM2') displayed by the display apparatus 110'.

The display system 100a of the present embodiment may be switched between and operated under the 3D display mode, the 2D display mode and the multi-view display mode. The switching between the 3D display mode, the 2D display mode and the multi-view display mode can be realized by integrated circuit or other suitable switching means. The 3D display mode, the 2D display mode and the multi-view display of the display system 100a are illustrated in detail as followings.

3D Display Mode

When the display system 100a is switched to and operated under the 3D display mode, the first image IM1' and the second image IM2' displayed by the display apparatus 110' are parallax images. The first image IM1' and the second image IM2' are respectively saw by different eyes of the viewer and the viewer can see a 3D image. In order to ensure that the first image IM1' and the second image IM2' can be respectively saw by different eyes of the viewer, the viewer is required to wear a pair of 3D glass G1' including one of the first lenses 120a and one of the second lenses 120a to see the display apparatus 110'.

During the time the first image IMP is displayed by the display apparatus 100', each of the first lenses 120a is turned on and each of the second lenses 130a is turned off such that the first image IM1' exclusively passes through each of the first lenses 120a. During the time the second image IM2' is displayed by the display apparatus 100', each of the second lenses 130a is turned on and each of the first lenses 120a is turned off such that the second image IM2' exclusively passes through each of the second lenses 130a. For example, each of the first lenses 120a comprises a first light-valve (e.g. liquid crystal light-valve), and each of the second lenses 130a comprises a second light-valve (e.g. liquid crystal light-valve).

Since the operation the first lenses 120a and the second lenses 130a are synchronized with the display apparatus 110', cross-talk between the first image IM1' and the second image IM2' saw by different eyes of the viewer does not occur. It is noted that the resolution of the 3D image constituted by the first image IM1' and the second image IM2' is the same as the real resolution of the display apparatus 110'.

It is noted that when the display system 100a is switched to and operated under the 3D display mode, the first image IM1' and the second image IM2' displayed by the display apparatus 110' may be complete different images, i.e. the first image IM1' and the second image IM2' are not required to be parallax images. At this time, the viewer who wears the pair of 3D glass G1' can not see 3D image, the viewers who wear a pair of glass G2' and a pair of glass G3' respectively can see different images display from the same display apparatus 110'.

2D Display Mode

When the display system 100a is switched to and operated under the 2D display mode, the first image IM1' and the second image IM2' are not necessary displayed by the display apparatus 110'. Only on 2D image is required to be displayed by the display apparatus 110'. Under the 2D display mode, the viewer is not required to wear the pair of 3D glass G1' and the viewer can the 2D image.

Multi-View Display Mode

When the display system 100a is switched to and operated under the multi-view display mode, the first image IM1' and the second image IM2' displayed by the display apparatus 110' are not required to be parallax images. The first image IM1' and the second image IM2' are irrelevant to each other. For example, the first image IM1' and the second image IM2' are entirely different (e.g. different pictures or different TV programs). In addition, when the display system 100a is switched to and operated under the multi-view display mode, the viewers who wear a pair of glass G2' and a pair of glass G3' respectively can see different images display from the same display apparatus 110'. Specifically, when the display apparatus 110' is saw by the viewers who wear the pair of glass G2' including two first lenses 120a, both eyes of the viewer see the first image IM1' irrelevant to the second image IM2' simultaneously. In other words, the second image IM2' is not saw by the viewers who wear the pair of glass G2'. Similarly, when the display apparatus 110' is saw by the viewers who wear the pair of glass G3' including two second lenses 130a, both eyes of the viewer see the second image IM2' irrelevant to the first image IM1' simultaneously. In other words, the first image IM1' is not saw by the viewers who wear the pair of glass G3'. As mentioned above, the pair of glass G2', the pair of glass G3' and the display apparatus 110' satisfy the requirements of two viewers.

It is noted that, in addition to the first image IM1' and the second image IM2', the display apparatus 110' may further display other images (e.g. the third images, the fourth images, and the $n^{th}$ images etc.). In this way, the display apparatus 110' may, satisfy the requirements of more viewers. For example, the third images, the fourth images, the $n^{th}$ images are required to be different from the first image IM1' and the second image IM2' such that viewers who wear glasses rather than the pair of glass G2' and the pair of glass G3' can see the third images, the fourth images, and the $n^{th}$ images respectively.

The first lenses 120a and the second lenses 130a of the glasses G1', G2' and G3' are designed to be detachable such that the viewers can detach the first lenses 120a and the second lenses 130a and recombine the lenses. For Example, the quantity of the first lenses 120a may be two or more than two and the quantity of the second lenses 130a may be two or more than two such that the viewers can obtain pairs of glasses G2' and G3' by recombination of the first lenses 120a and the second lenses 130a. However, the detachable design of the first lenses 120*a* and the second lenses 130*a* is not necessary in the present application.

Third Embodiment

Figure 3:
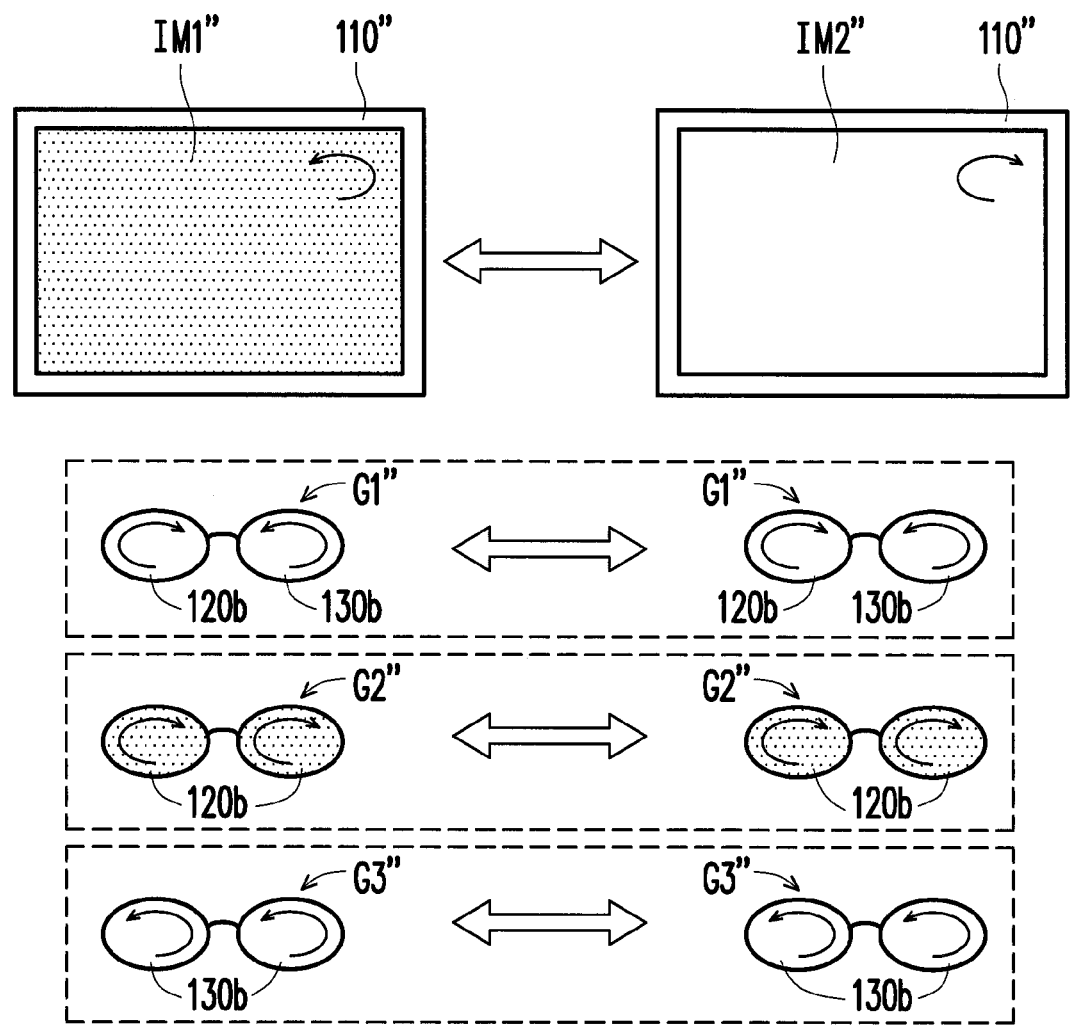
FIG. 3 is a schematic view of a display system according to the third embodiment of the application.

FIG. 3 is a schematic view of a display system according to the third embodiment of the application. Referring to FIG. 3, the display system 100*b* of the present embodiment includes a display apparatus 110" for displaying a first image IM1" and a second image IM2" alternately, two first lenses 120*b* and two second lenses 130*b*.

To ensure that the display apparatus 100" can display the first image IM1" and the second image IM2" alternately, the display apparatus 100" has a switchable retarder, and the switchable retarder alternately switches between a first retardation state and a second retardation state. When the switchable retarder is switched to the first retardation state, the display apparatus 100" displays the first image IM". When the switchable retarder is switched to the second retardation state, the display apparatus 100" displays the second image IM". For example, the phase retardation difference between the first retardation state and the second retardation state is about ë/2. For example, phase retardations of the first retardation state and the second retardation state are 0 and ë/2, respectively. In an alternative embodiment of the present application, phase retardations of the first retardation state and the second retardation state are +ë/4 and –ë/4, respectively.

In addition, the switchable retarder of the present embodiment is a light-valve (e.g. a liquid crystal light-valve).

The display system 100*b* of the present embodiment may be switched between and operated under the 3D display mode, the 2D display mode and the multi-view display mode. The switching between the 3D display mode, the 2D display mode and the multi-view display mode can be realized by integrated circuit or other suitable switching means. The 3D display mode, the 2D display mode and the multi-view display of the display system 100*b* are illustrated in detail as followings.

3D Display Mode

When the display system 100*b* is switched to and operated under the 3D display mode, the first image IM1" and the second image IM2" displayed by the display apparatus 110' are parallax images. The first image IM1" and the second image IM2" are respectively saw by different eyes of the viewer and the viewer can see a 3D image. In order to ensure that the first image IM1" and the second image IM2" can be respectively saw by different eyes of the viewer, the viewer is required to wear a pair of 3D glass G1" including one of the first lenses 120*b* and one of the second lenses 120*b* to see the display apparatus 110".

In the present embodiment, the first image IM1" has a levorotary circular polarization, the second image IM2" has a dextrorotary circular polarization, each of the first lenses 120*b* permits the levorotary circular polarized light (i.e. the first image IM1") passing through and cuts the dextrorotary circular polarized light (i.e. the second image IM2"), and each of the second lenses 130*b* permits the dextrorotary circular polarized light (i.e. the second image IM2") passing through and cuts the levorotary circular polarized light (i.e. the first image IM1").

Since the light with different circular polarizations can be recognized by the first lenses 120*b* and the second lenses 130*b*, cross-talk between the first image IM1" and the second image IM2" saw by different eyes of the viewer does not occur. It is noted that the resolution of the 3D image constituted by the first image IM1" and the second image IM2" is the same as the real resolution of the display apparatus 110".

It is noted that when the display system 100*b* is switched to and operated under the 3D display mode, the first image IM1" and the second image IM2" displayed by the display apparatus 110" may be complete different images, i.e. the first image IM1" and the second image IM2" are not required to be parallax images. At this time, the viewer who wears the pair of 3D glass G1" can not see 3D image, the viewers who wear a pair of glass G2" and a pair of glass G3" respectively can see different images display from the same display apparatus 110".

2D Display Mode

When the display system 100*b* is switched to and operated under the 2D display mode, the first image IM1" and the second image IM2" are not necessary displayed by the display apparatus 110". Only on 2D image is required to be displayed by the display apparatus 110". Under the 2D display mode, the viewer is not required to wear the pair of 3D glass G1" and the viewer can the 2D image.

Multi-View Display Mode

When the display system 100*b* is switched to and operated under the multi-view display mode, the first image IM1" and the second image IM2" displayed by the display apparatus 110" are not required to be parallax images. The first image IM1" and the second image IM2" are irrelevant to each other. For example, the first image IM1" and the second image IM2" are entirely different (e.g. different pictures or different TV programs). In addition, when the display system 100*b* is switched to and operated under the multi-view display mode, the viewers who wear a pair of glass G2" and a pair of glass G3" respectively can see different images display from the same display apparatus 110". Specifically, when the display apparatus 110" is saw by the viewers who wear the pair of glass G2" including two first lenses 120*b*, both eyes of the viewer see the first image IM1" irrelevant to the second image IM2" simultaneously. In other words, the second image IM2" is not saw by the viewers who wear the pair of glass G2". Similarly, when the display apparatus 110" is saw by the viewers who wear the pair of glass G3" including two second lenses 130*b*, both eyes of the viewer see the second image IM2" irrelevant to the first image IM1" simultaneously. In other words, the first image IM1" is not saw by the viewers who wear the pair of glass G3". As mentioned above, the pair of glass G2", the pair of glass G3" and the display apparatus 110" satisfy the requirements of two viewers.

It is noted that, in addition to the first image IM1" and the second image IM2", the display apparatus 110" may further display other images (e.g. the third images, the fourth images, and the $n^{th}$ images etc.). In this way, the display apparatus 110*b* may satisfy the requirements of more viewers. For example, the third images, the fourth images, the $n^{th}$ images are required to be different from the first image IM1" and the second image IM2" such that viewers who wear glasses rather than the pair of glass G2" and the pair of glass G3" can see the third images, the fourth images, and the $n^{th}$ images respectively.

The first lenses 120*b* and the second lenses 130*b* of the glasses G1", G2" and G3" are designed to be detachable such that the viewers can detach the first lenses 120*b* and the second lenses 130*b* and recombine the lenses. For Example, the quantity of the first lenses 120*b* may be two or more than two and the quantity of the second lenses 130*b* may be two or more than two such that the viewers can obtain pairs of glasses G2" and G3" by recombination of the first lenses 120*b* and the second lenses 130*b*. However, the detachable design of the first lenses 120*b* and the second lenses 130*b* is not necessary in the present application.

Though the first lenses and the second lenses with circular polarization are illustrated, the linear polarized lenses, ellipse polarized lenses, red filter lenses, green filter lenses, blue filter lenses or other suitable lenses may also be utilized in an alternative embodiment of the present application. As long as the design of the lenses can meet the operation of the display apparatus, the viewers can see different images, which are displayed by the display apparatus under the 3D display mode, the 2D display mode and the multi-view display mode, through different combinations of the lenses. The types of the first lenses and the second lenses are not limited in the present application.

In the present application, the viewers can watch different images when the viewers wear different lenses combinations. Not only a 2D display mode and a 3D display mode are provided by the display system of the present application, but also a multi-view display mode is provided. Accordingly, viewers can respectively see multiple 2D images irrelevant to each other when the display system is switched to the multi-view display mode.

Although the present invention has been disclosed by the above embodiments, they are not intended to limit the present invention. Those skilled in the art may make some modifications and alterations without departing from the spirit and scope of the present invention. Therefore, the protection range of the present invention falls in the appended claims.

What is claimed is:

1. A display system, comprising:
    a display apparatus for displaying a first image and a second image substantially different from the first image;
    two first lenses;
    two second lenses substantially different from the first lenses;
    when the display apparatus is saw by different eyes of a first viewer via one of the first lenses and one of the second lenses respectively, and the first image as well as the second image are parallax images, the first image and the second image are saw by different eyes of the viewer respectively;
    when the display apparatus is saw by eyes of the first viewer via the two first lenses and a second viewer via the two second lenses, and the first image as well as the second image displayed at the same time are not parallax images, the first image irrelevant to the second image is saw by eyes of the first viewer simultaneously, and the second image irrelevant to the first image is saw by eyes of the second viewer simultaneously.

2. The display system of claim 1, wherein the display apparatus comprises a plurality of first display regions and a plurality of second display regions, the first image is displayed by the first display regions, and the second image is displayed by the second display regions.

3. The display system of claim 2, wherein a levorotary circular polarized light is provided by the first display regions, a dextrorotary circular polarized light is provided by the second display regions, each of the first lenses permits the levorotary circular polarized light passing through and cuts the dextrorotary circular polarized light, and each of the second lenses permits the dextrorotary circular polarized light passing through and cuts the levorotary circular polarized light.

4. The display system of claim 1, wherein the first image and the second image respectively saw by different eyes of the first viewer constitute a three-dimensional image when the display apparatus is saw by different eyes of the first viewer via one of the first lenses and one of the second lenses respectively, and the first image as well as the second image are parallax images.

5. A display system, comprising:
    a display apparatus for displaying a first image and a second image substantially different from the first image;
    two first lenses;
    two second lenses substantially different from the first lenses;
    when the display apparatus is saw by eyes of a first viewer via the two first lenses and a second viewer via the two second lenses, and the first image as well as the second image displayed at the same time are parallax images, the first image irrelevant to the second image is saw by eyes of the first viewer simultaneously, and the second image irrelevant to the first image is saw by eyes of the second viewer simultaneously.

6. The display system of claim 5, wherein the display apparatus comprises a plurality of first display regions and a plurality of second display regions, the first image is displayed by the first display regions, and the second image is displayed by the second display regions.

7. The display system of claim 6, wherein a levorotary circular polarized light is provided by the first display regions, a dextrorotary circular polarized light is provided by the second display regions, each of the first lenses permits the levorotary circular polarized light passing through and cuts the dextrorotary circular polarized light, and each of the second lenses permits the dextrorotary circular polarized light passing through and cuts the levorotary circular polarized light.

* * * * *